United States Patent [19]
Shinonaga

[11] Patent Number: 5,771,014
[45] Date of Patent: Jun. 23, 1998

[54] RADAR APPARATUS

[75] Inventor: Mitsuyoshi Shinonaga, Yokohama, Japan

[73] Assignee: Kabushiki Kaisha Toshiba, Kawasaki, Japan

[21] Appl. No.: 741,203

[22] Filed: Oct. 29, 1996

[30]     Foreign Application Priority Data

Oct. 31, 1995  [JP]  Japan .................................. 7-284043

[51] Int. Cl.$^6$ ...................................................... G01S 7/02
[52] U.S. Cl. .............................................................. 342/140
[58] Field of Search ................................. 342/140, 160, 342/159, 134

[56]              References Cited

U.S. PATENT DOCUMENTS

| | | | |
|---|---|---|---|
| 3,885,237 | 5/1975 | Kirkpatrick | 342/159 |
| 4,649,390 | 3/1987 | Andrews et al. | 342/140 |
| 5,138,323 | 8/1992 | Taylor, Jr. | 342/134 |

FOREIGN PATENT DOCUMENTS 6-174823   6/1994   Japan .

Primary Examiner—Daniel T. Pihulic
Attorney, Agent, or Firm—Oblon, Spivak, McClelland, Maier & Neustadt, P.C.

[57]                     ABSTRACT

In a transmission mode, one repetition transmission pulse generated by a transmitter is divided into a plurality of subpulses having different frequencies by a variable distributor. The subpulses are assigned to a plurality of elevation angle directions by phase shifters, and the assigned subpulses are transmitted from an antenna device. In a reception mode, the reflected signals of the subpulses transmitted in the range of the plurality of elevation or inclination angles are captured from this range by the antenna device. The captured signals are simultaneously received by a plurality of receivers and EL synthesis units. The number of reception channels is set equal to or larger than the number of transmission subpulses. Each reception channel is controlled on the basis of the reception elevation angle range calculated by an arithmetic processing unit such that the corresponding reception beam covers a wider elevation angle range for a short range, and the elevation angle range is narrowed with an increase in range. By this processing, both uniformity of a sensitivity in an entire coverage and an increase in sensitivity at a coverage end which tends to be short in sensitivity due to reception antenna pattern control can be realized.

17 Claims, 4 Drawing Sheets

RADAR APPARATUS

BACKGROUND OF THE INVENTION

1. Field of the Invention

The present invention relates to a radar apparatus, e.g., a long-range air surveillance radar apparatus and, more particularly, to a technique for uniforming a reception sensitivity within a radar coverage.

2. Description of the Related Art

In a long-range air surveillance radar apparatus, the maximum range and altitude of the search coverage are normally limited. Although the short-range search coverage must cover a wide elevation angle range, the long-range coverage covers only a narrow elevation angle range, as shown in FIG. 7.

There are two conventional methods to uniform the reception sensitivity within a coverage and perform transmission without wasting energy: (1) an antenna pattern is shaped in accordance with $\csc^2\theta$ ($\theta$: elevation angle) to match the reception sensitivity with the coverage; and (2) the antenna directivity direction of an antenna pattern is gradually shifted from a small-elevation angle direction to a large-elevation angle direction, and every time the direction is changed, the reception sensitivity is adjusted with a change in, e.g., transmission pulse width, thereby matching the reception sensitivity with the coverage.

According to method (1), however, since the antenna pattern is shaped, the maximum gain decreases about 2 to 3 dB to shorten the maximum range. According to method (2), since the elevation angle range is wide, it takes a long period of time to complete transmission/reception for all elevation angles in one azimuth direction. Therefore, the rotation speed (scanning rate) of the antenna must be slowed down to prolong an interval for obtaining data.

In either method (1) or (2), the reception level of an unnecessary signal (clutter) generated by reflection on ground or the like abruptly increases with a change in reception level to a short range. Therefore, the dynamic range of the short range must be suppressed.

A conventional radar apparatus employs a technique called STC (Sensitivity Time Control) for adjusting the system sensitivity when the reception range comes close to a short range. For example, STC in method (1) performs shaping called boost-up for keeping high the antenna gain of a larger elevation angle than $\csc^2\theta$.

In this STC, however, the maximum antenna gain is undesirably lowered because the reception sensitivity at a large elevation angle is maintained while a signal received from a short range is attenuated.

As a prior art for solving the above problem, Jpn. Pat. Appln. KOKAI Publication No. 5-174823 (Japanese Patent Application No. 4-324224) discloses a radar apparatus for controlling a reception antenna pattern. In order to uniform the sensitivity within the search coverage, this radar apparatus controls an antenna pattern in accordance with a range. That is, a pattern having a large antenna beam width is used at a short range immediately upon transmission, but a pattern having a small beam width is used with an increase in range.

Although the radar apparatus of the above prior art can uniform the sensitivity within the coverage to some extent, a single reception beam does not necessarily cover a predetermined coverage shape. When a pattern having a large beam width, which can cope with the above shape, is used, a new problem as a shortage of the sensitivity at the ends of the coverage is posed.

In particular, a sensitivity shortage tends to occur at the remote end of the coverage in a long-range radar. Although a dense beam is used to uniform the sensitivity and compensate for the sensitivity shortage, thereby solving the above problem, it is difficult to make a practical measure because the radar apparatus of the prior art uses a single reception beam.

SUMMARY OF THE INVENTION

As described above, although the conventional radar apparatus can uniform the sensitivity within the coverage to some extent, the single reception beam does not necessarily cover the predetermined coverage shape. It is very difficult to uniform the sensitivity up to the remote coverage end and suppress the decrease in sensitivity.

It is an object of the present invention to provide a radar apparatus capable of simultaneously realizing uniformity of sensitivity in the entire coverage and an increase in sensitivity at a coverage end where the sensitivity is short due to control of a reception antenna pattern.

According to the present invention, there is provided a radar apparatus comprising transmission means for forming a transmission beam and repeatedly transmitting a transmission pulse to a predetermined coverage, reception means having a plurality of reception channels to form reception beams having arbitrary independent elevation or inclination angles in an arbitrary direction, and to receive a reflected signal of the transmission pulse from a beam formation region, and reception channel control means for selectively assigning the plurality of reception channels in accordance with a range, and selectively controlling the plurality of reception channels such that a wide elevation or inclination angle range is covered on a short-range side in the transmission beam formation region, and a narrow elevation or inclination angle range is covered with an increase in range.

According to the present invention, a plurality of reception beams are prepared in advance and are adaptively directed to a coverage end portion which tends to be short in sensitivity, in accordance with the range. More specifically, in a long-range area, a larger number of reception beams are assigned to an elevation angle corresponding to a lower transmission beam which is in charge of the farthest end of the coverage to form a dense reception beam, thereby compensating for the sensitivity at the long-range end. In a short-range area, the elevation angle range is shared by a plurality of beams to satisfy the predetermined coverage on the large-elevation angle side, thereby adaptively applying the plurality of reception beams.

In the radar apparatus having the above arrangement, the antenna pattern shape in the reception mode is changed in accordance with the range, and the sensitivity at the maximum range is not lowered. An optimal sensitivity can be obtained at any range within the given radar coverage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENT

An embodiment of the present invention will be described in detail with reference to the accompanying drawings.

Figure 1:
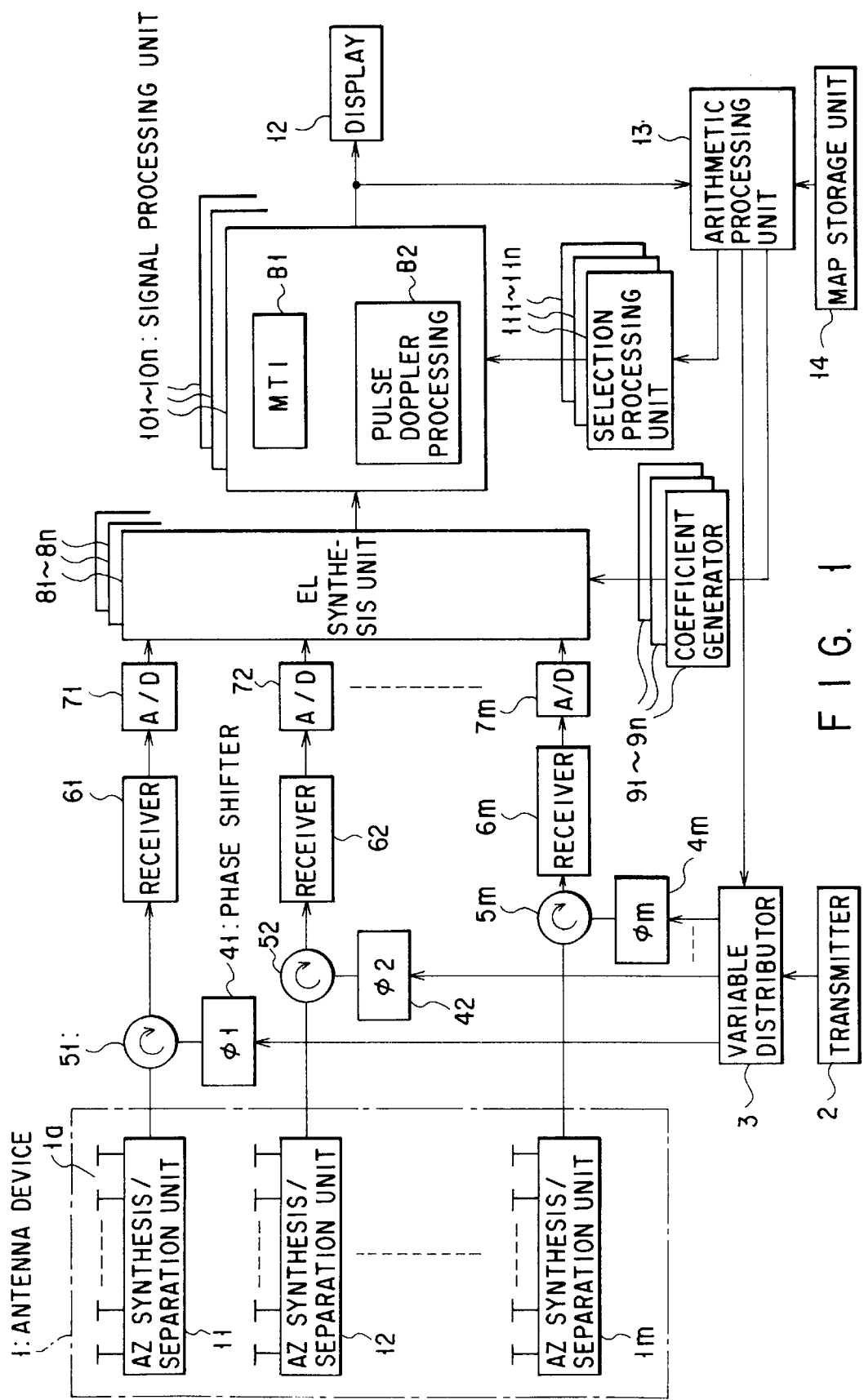
FIG. 1 is a block diagram showing the arrangement of a radar apparatus according to an embodiment of the present invention.

FIG. 1 shows the arrangement of a radar apparatus of the present invention. Referring to FIG. 1, an antenna device 1 is arranged such that antenna elements 1a are arranged in m lines (determined by the radar system) in the azimuth angle (AZ) direction and l lines in the elevation angle (EL), and the antenna elements arranged in the azimuth angle direction are mounted on m AZ synthesis/separation units 11 to 1m, so that scanning can be performed in all directions.

The AZ synthesis/separation units 11 to 1m distribute transmission signals to the respective antenna elements and synthesize and output the reception signals of the antenna elements.

A transmitter 2 generates repetition transmission pulses having a predetermined frequency. These transmission pulses are distributed to a maximum of m channels by a variable distributor 3 and transmitted to the AZ synthesis/separation units 11 to 1m through phase shifters 41 to 4m and transmission/reception switches (circulators) 51 to 5m. The transmission pulses are transmitted from the respective antenna elements in directions determined by the phase shifters 41 to 4m.

AZ synthesis reception signals from the AZ synthesis/separation units 11 to 1m are demodulated and detected by receivers 61 to 6m through the transmission/reception switches 51 to 5m. The demodulated and detected signals are converted into digital signals by A/D (Analog/Digital) converters 71 to 7m, and the digital signals are supplied to EL synthesis units 81 to 8n as parallel data.

Figure 2:
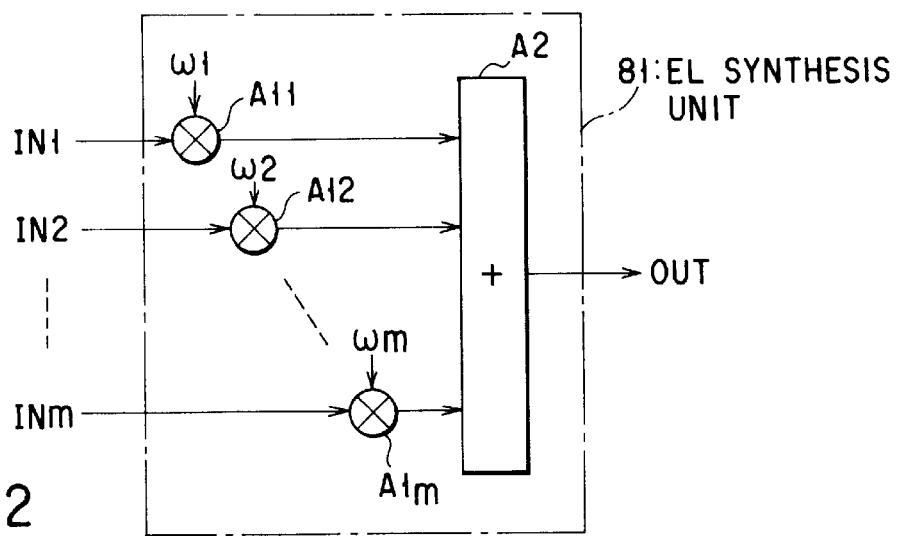
FIG. 2 is a block diagram showing the arrangement of an EL synthesis unit of the embodiment in FIG. 1.

FIG. 2 shows the detailed arrangement of the EL synthesis unit 81. The EL synthesis units 82 to 8n have the same arrangement as that of the EL synthesis unit 81, and a detailed description thereof will be omitted.

More specifically, the EL synthesis unit 81 comprises multipliers A11 to A1m, each for one channel. The multipliers A11 to A1m multiply the AZ synthesis digital signals of the corresponding channels with coefficients supplied in units of channels from a coefficient generator 91 (92 to 9n correspond to 82 to 8n). The products are supplied to an adder A2, and the adder A2 outputs a sum.

The synthesis outputs from the EL synthesis units 81 to 8n are supplied to signal processing units 101 to 10n, respectively. Each of the signal processing units 101 to 10n has a moving target detection circuit (MTI) B1 and a pulse doppler processing circuit B2.

The moving target detection circuit B1 removes a clutter component from the input synthesis reception signal to extract a moving target component. The pulse doppler processing circuit B2 extracts only a doppler component from the synthesis reception signal, thereby detecting the moving target component.

Each of the signal processing units 101 to 10n selects one, both, or neither of the moving target detection circuit B1 and the pulse doppler processing circuit B2 in accordance with a selection command signal from a corresponding one of selection processing units 111 to 11n. The pieces of radar reception information respectively output from the signal processing units 101 to 10n are selectively displayed on the screen of a display 12 and also supplied to an arithmetic processing unit 13.

The arithmetic processing unit 13 measures the reception intensities in each or all of the range, azimuth angle, and elevation angle for each scanning cycle from the radar reception information obtained from the signal processing units 101 to 10n, averages the measurement results, and prepares a map on the basis of the average values. The map is then stored in a map storage unit 14.

The arithmetic processing unit 13 looks up the map stored in the map storage unit 14, performs distribution channel selection control for the variable distributor 3, and coefficient value selection control for the coefficient generators 91 to 9n, and performs selection processing control for the signal processing units 101 to 10n through the selection processing units 111 to 11n. The coefficient value selection control includes phase control and gain (amplitude) control for reception signals of the respective channels. By combining these control operations, the reception pattern shape such as a gain, a beam width, and a side-lobe level is changed depending on a desired range.

The processing operations of the above arrangement will be described below. Note that n of the EL synthesis units 81 to 8n, the coefficient generators 91 to 9n, the signal processing units 101 to 10n, and the selection processing units 111 to 11n is given as n=5.

In the antenna device 1, the transmission pulses output from the transmitter 2 are appropriately distributed into the respective channels by the variable distributor 3. The distributed pulses are phase-adjusted by the phase shifters 41 to 4m and transmitted into air from the respective antenna elements through the transmission/reception switches 51 to 5m and the AZ synthesis/separation units 11 to 1m.

The reflected signals of the transmission pulses which are received by the respective antenna elements 1a are primarily synthesized by the AZ synthesis/ separation units 11 to 1m. The synthesized signals are demodulated and detected by receivers 61 to 6m through the transmission/reception switches 51 to 5m. The demodulated and detected signals are then converted into digital signals by the A/D converters 71 to 7m. The digital signals are synthesized by the EL synthesis units 81 to 85.

Figure 3A:
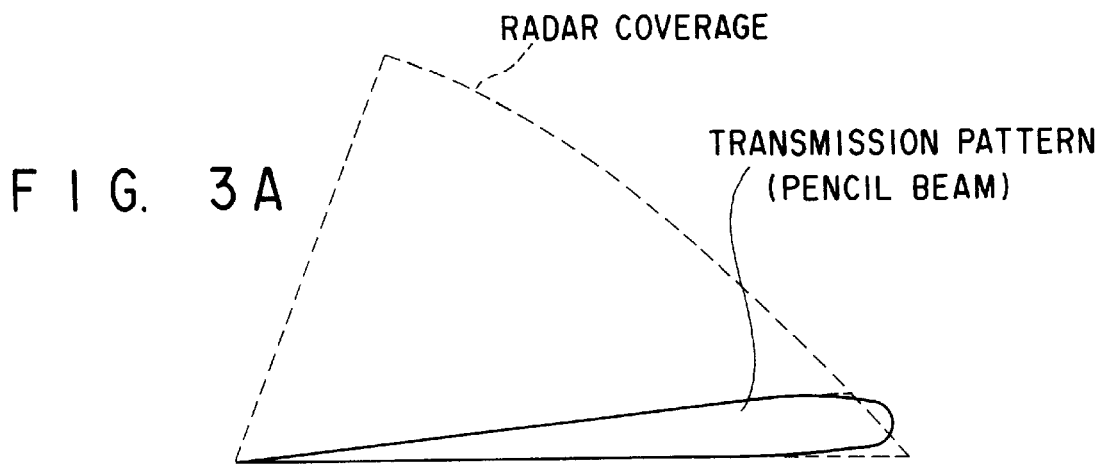
FIGS. 3A and 3B are views showing the shapes of antenna patterns in transmission and reception modes when a coverage having a small elevation angle is to be searched.

Assume that an antenna pattern is formed at a small elevation angle which requires a maximum range within a predetermined coverage. In the transmission mode, the transmission pulses are distributed into all the channels by the variable distributor 3. The pulses are phase-shifted by the phase shifters 41 to 4m to obtain a small beam width at a small elevation angle. The resultant beam is output using all the antenna elements. As shown in FIG. 3A, a transmission pattern using a pencil beam is formed in an area having a maximum range and a small elevation angle.

Figure 3B:
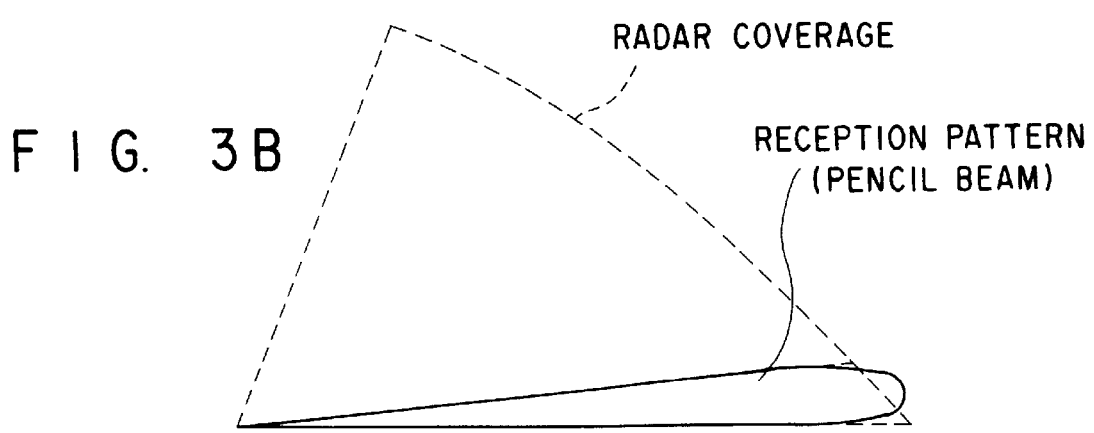

In the reception mode for receiving this long-range transmission pattern, the reception signals of the respective channels are synthesized by the fifth EL synthesis unit 85. In this case, the coefficients for the multipliers A11 to A1m are controlled to minimize the beam width and maximize the gain. As shown in FIG. 3B, a reception pattern having a pencil beam can be formed in an area having a maximum range and a small elevation angle, thereby maximizing the reception sensitivity.

Figure 4A:
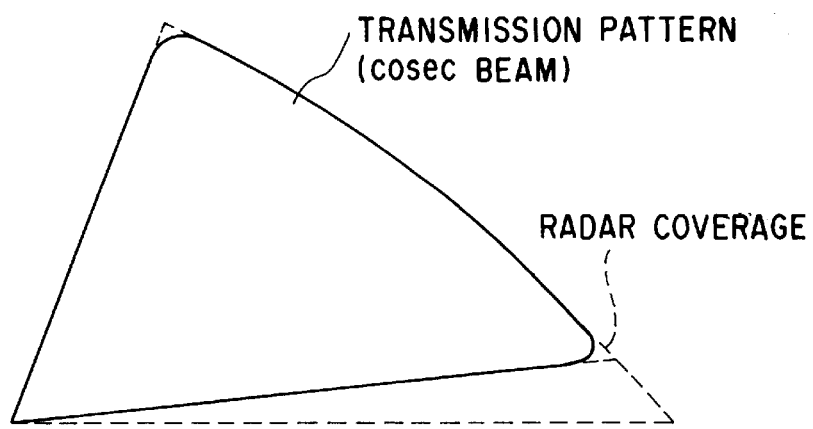
FIGS. 4A and 4B are views showing the shapes of antenna patterns in the transmission and reception modes when a coverage having a large elevation angle is to be searched.

In a short-range area where a large beam width in the wide elevation angle range at larger elevation angles is required, the transmission pulses are distributed into all or some of the channels (one of the upper and lower channel groups) by the variable distributor 3, and the phase shifters 41 to 4m of the corresponding channels are adjusted to increase the beam width at a large elevation angle. The beam is transmitted using the antenna elements of the distributed channels. As shown in FIG. 4A, a transmission pattern using a cosec beam having a large elevation angle can be formed.

In the reception mode for receiving this short-range transmission pattern, the reception signals of the respective channels are synthesized by the first EL synthesis unit 81. In this case, for example, some of the coefficients supplied to the multipliers A11 to A1m are set to zero to reduce the number of synthesis channels, thereby maximizing the beam width and decreasing the gain to a desired value. As shown in R1 in FIG. 3B, a reception pattern using a fan beam can be formed in the coverage having a short range and a wide elevation angle range at larger elevation angles.

Figure 4B:
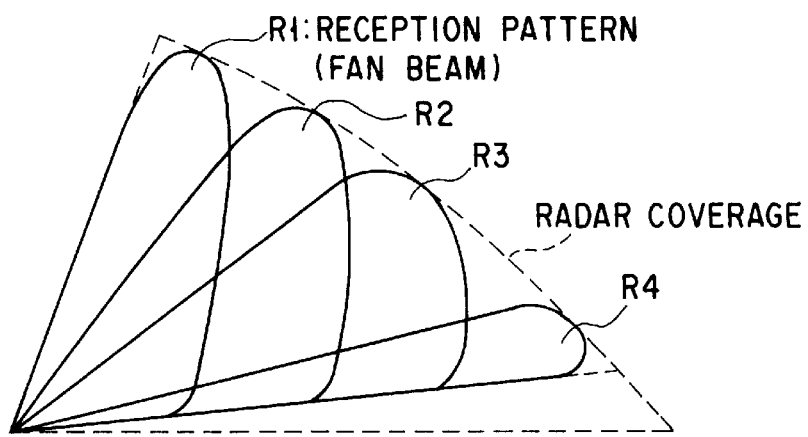

When the reception range is to be increased, the reception signals of the respective channels are synthesized selectively using the second to fourth EL synthesis units 82 to 84. In this case, the coefficients to be supplied to the multipliers A11 to A1m are controlled in accordance with the range, and the number of synthesis channels is increased to decrease the beam width and increase the gain. Therefore, as indicated by R2, R3, and R4 in FIG. 4B, the reception pattern using a fan beam can be changed along the predetermined coverage.

The pattern is controlled in accordance with the range, as described above, and this control is apparently applicable to an area having a maximum range and a small elevation angle.

Beam formation processing for an area having a maximum range and a small elevation angle is performed independently of beam formation processing for an area having a large elevation angle and a short range, and the antenna pattern is changed in accordance with the range during reception. A large number of transmission operations in the elevation angle direction need not be performed in order, and a decrease in antenna gain in the maximum-range direction can be avoided. At a short range, since the antenna gain decreases with an increase in beam width, the STC function for lowering the sensitivity at the short range can also be performed.

By using the above processing operations, a plurality of reception beams are prepared in advance and adaptively directed in accordance with the range and the coverage end portion which tends to be short in sensitivity.

More specifically, in reception for the long-range area, a large number of reception beams are assigned to an elevation angle corresponding to a lower transmission beam which is in charge of the farthest end of the coverage, thereby forming a dense reception beam and hence compensating for the sensitivity at the long-range end. In reception for the short-range area, the elevation angle coverage is shared by the plurality of beams to cover the predetermined coverage on the large-elevation angle side.

A practical application method will be described below.

Transmission pulses output from the transmitter 2 are divided into two groups by the variable distributor 3 to generate first and second subpulses. These subpulses are assigned and transmitted to the areas obtained by dividing the radar coverage into two portions in the elevation angle direction. In this case, the first subpulse is in charge of the area of small elevation angles shown in FIG. 3A, and the second subpulse is in charge of the area of large elevation angles shown in FIG. 4A.

In this case, the transmission beam on the small-elevation angle side including the farthest end serves as a pencil beam, and the antenna pattern for the transmission beam on the large-elevation angle side is changed in accordance with the range. Therefore, the sensitivity can be considerably uniformed within the coverage.

Figure 5A:
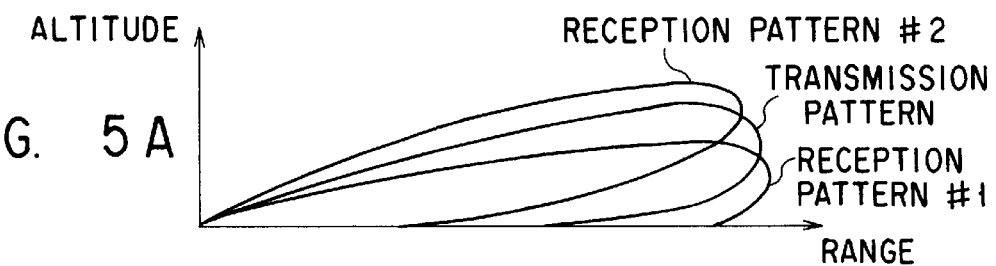
FIGS. 5A and 5B are graphs showing the shapes of antenna patterns in assigning a plurality of reception beams to transmission beams when a coverage having a maximum range and a small elevation angle is to be searched.

In the reception system, reception beams are formed for two reception frequencies by, e.g., four EL beam synthesis units 81 to 84. In this case, as shown in FIGS. 5A and 5B, two reception beams #1 and #2 can be assigned to the two ends of one transmission pattern.

Figure 5B:
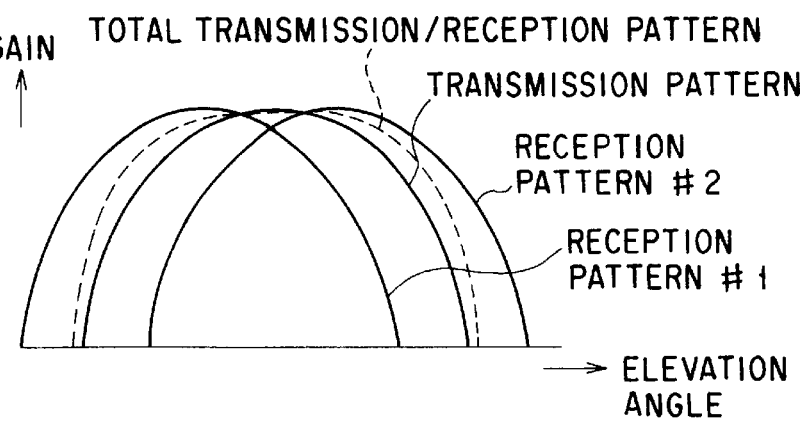

According to this beam arrangement, a pattern wider than the transmission pattern can be obtained as the total transmission/reception pattern, as shown in FIG. 5B. For this reason, the sensitivity can be uniformed over a wide elevation angle range with high precision, and the transmission energy can be saved.

In particular, in the long-range area, a larger number of reception beams are assigned to an elevation angle range corresponding to the lower transmission beam which is in charge of the farthest end of the coverage, thereby forming a dense reception beam. Therefore, the sensitivity can be compensated for the long-range end.

Figure 6A:
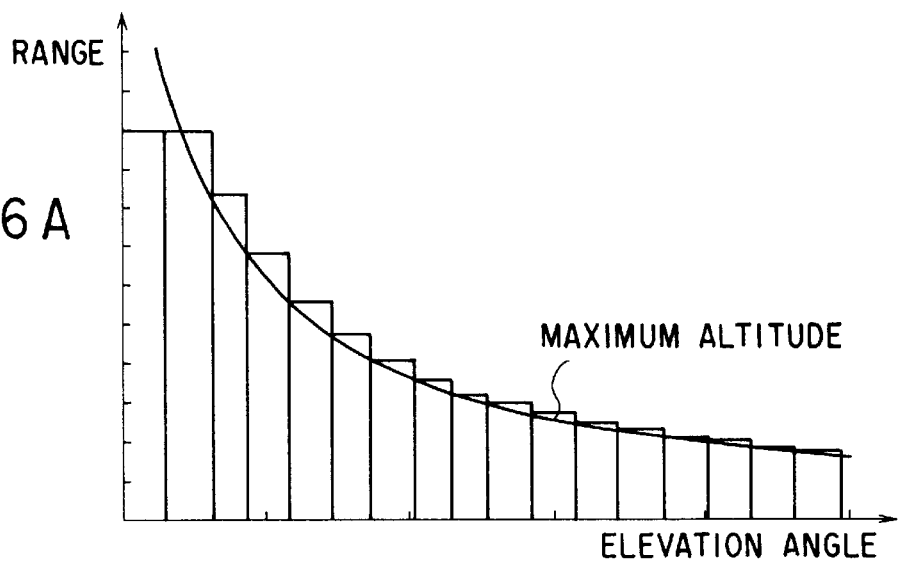
FIGS. 6A and 6B are graphs showing assignment of a plurality of reception beams depending on the range and elevation angle when a coverage having a large elevation angle and a short range is to be searched.

The relationship between the elevation angles and ranges of the transmission and reception beams is an inversely proportional relationship, as shown in FIG. 6A, because the maximum altitude is predetermined. A conventional technique uniquely determines the elevation angle of a reception beam in accordance with the range, as shown in FIG. 6A. According to this technique, however, the sensitivity of the entire coverage cannot be uniformed due to the reason described above. According to this embodiment, the coverage of the elevation angle direction is shared by a plurality of reception beams in accordance with the range, thereby covering the predetermined coverage on the large-elevation angle side.

Figure 6B:
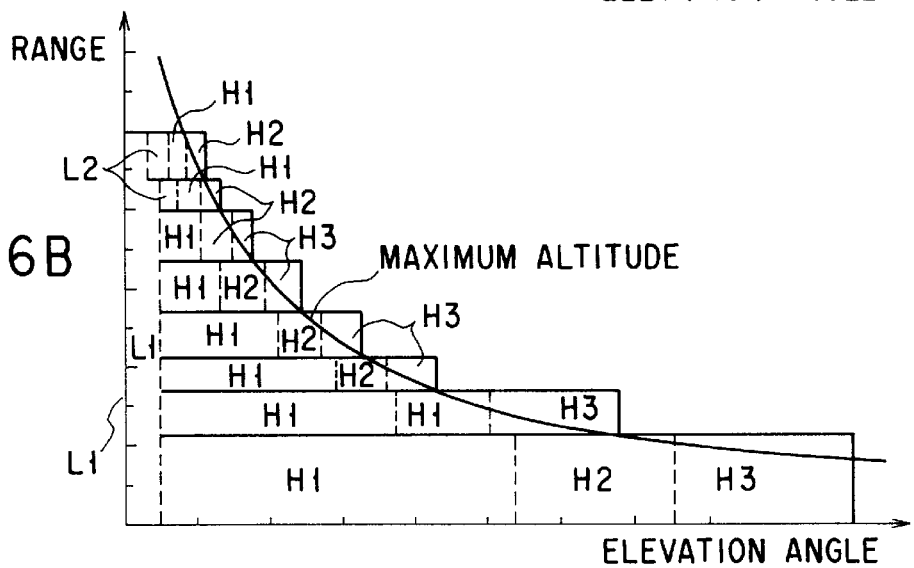
Figure 7:
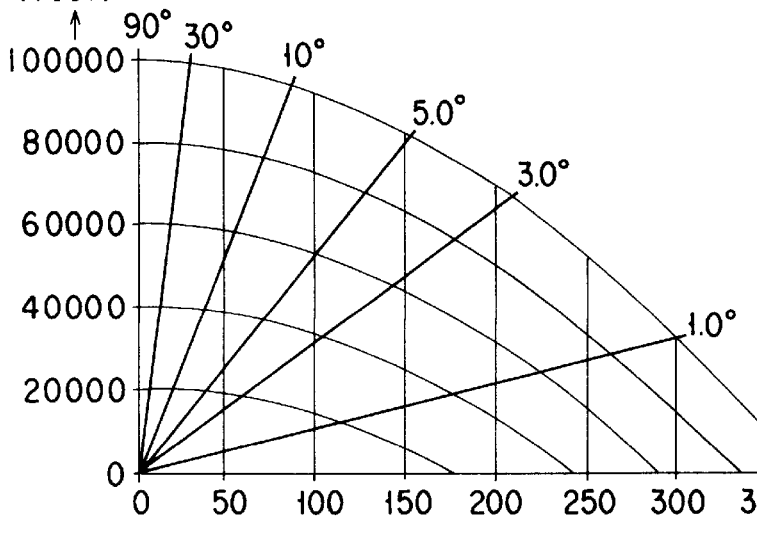
FIG. 7 is a graph showing a search coverage range required for the radar apparatus.

An example of the above arrangement is shown in FIG. 6B. Reference symbols L1 and L2 denote small-elevation angle reception beams #1 and #2 (for #1<#2), respectively. Reference symbols H1, H2, and H3 denote large-elevation angle reception beams #1, #2, and #3 (for #1<#2<#3), respectively. As shown in FIG. 6B, the farthest end is covered by the small-elevation angle reception beam L1. When the range comes close to a short range, the reception beams L2, H1, H2, and H3 are added. Since the elevation angle can be controlled on the basis of the distance, a single EL beam synthesis unit may be used to selectively control the elevation angles of beams L2 and L3 which are not used at the same time. The small-elevation angle reception beam used in the long range serves as a large-elevation angle reception beam in a short range. Therefore, the sensitivity on the large-elevation angle side can also be uniformed.

The radar apparatus having the above arrangement can match the reception sensitivity with all coverages to be searched, without decreasing the maximum range and the maximum sensitivity.

The range control of the antenna patterns has been described above. A better effect can be obtained when the reception sensitivity is controlled also in consideration of a clutter state and a side-lobe level.

The arithmetic processing unit 13 measures the reception intensities in each or all of the range, azimuth angle, and elevation angle for each scanning cycle from the reception signal from the antenna device 1, averages the measurement results, and prepares a map. The map is then stored in the map storage unit 14. The arithmetic processing unit 13 looks up the stored map and controls the variable distributor 3 and the phase shifters 41 to 4m in the transmission mode and the coefficient generators 91 to 9n in the reception mode so as to lower the reception sensitivity at the range and elevation angle corresponding to strong clutter or the like, thereby changing the antenna pattern shape. Therefore, the clutter and the side-lobe level can be effectively suppressed during signal processing.

In order to improve the precision of the map, for example, an antenna beam is scanned by phase control of the phase shifters 41 to 4m, and each or all of the intensities of the range, azimuth angle, and elevation angle are measured every scanning during map formation. The measurement results are averaged, and a map is formed on the basis of each average value.

The load on the signal processing units 101 to 10n can be reduced in accordance with the contents of the formed maps. More specifically, the arithmetic processing unit 13 looks up the map stored in the map storage unit 14 and selectively uses the moving target detection circuit B1 and the pulse doppler processing circuit B2, as needed, in accordance with the reception intensity information of each or all of the range, azimuth angle, and elevation angle in the map, thereby expecting a better processing effect.

In particular, maps are formed from the processing results of the moving target detection circuit B1 and the pulse doppler processing circuit B2, and selection of these circuits can be determined in accordance with remaining clutter occurring in one or both of the outputs from the moving target detection circuit B1 and the pulse doppler processing circuit B2. Therefore, this improves precision of target detection.

The above description has been made on an assumption of a ground radar. However, the present invention is also applicable to an aircraft radar when the elevation angle is replaced with an inclination angle. That is, a large number of simultaneous reception channels are assigned for a short range to a frequency on a large-inclination angle side of a plurality of subpulse transmission directions. When the range is shifted to a long range, the number of simultaneously reception channels is reduced, and at the same time the number of reception channels for a frequency on a small-inclination angle side is increased.

As has been described above, according to the present invention, there can be provided a radar apparatus capable of simultaneously realizing uniformity in sensitivity of an entire coverage and the increase in sensitivity at a coverage end which tends to be short in sensitivity due to reception antenna pattern control.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radar apparatus comprising:
   transmission means for forming a transmission beam and repeatedly transmitting a transmission pulse to a predetermined coverage;
   reception means having a plurality of reception channels to form reception beams having arbitrary independent elevation or inclination angles in an arbitrary direction, and to receive a reflected signal of the transmission pulse from a beam formation region; and
   reception channel control means for selectively assigning the plurality of reception channels in accordance with a range, such that when the range is shifted from a short range to a long range, the number of reception channels assigned to the plurality of reception beams having a larger elevation or inclination angle region is reduced, and the number of reception channels assigned to the plurality of reception beams smaller elevation or inclination angle region is increased.

2. An apparatus according to claim 1, wherein said reception means comprises a plurality of digital beam formation means for simultaneously forming a plurality of reception beams, and
   said reception channel control means assigns said plurality of digital beam formation means respectively to the plurality of reception channels.

3. An apparatus according to claim 1, wherein said transmission means generates the repetition transmission pulse as a plurality of subpulses having different frequencies and assigns and transmits the plurality of subpulses to a plurality of regions obtained by dividing the coverage in the elevation or inclination angle direction,
   said reception means has reception channels, the number of which is not less than that of the plurality of subpulses, and
   said reception channel control means assigns at least two reception channels to transmission regions of the plurality of subpulses and causes said reception means to simultaneously receive reflected signals of the subpulses transmitted from the respective transmission regions.

4. An apparatus according to any one of claims 1 or 2, wherein said reception means comprises a plurality of digital beam formation means for simultaneously forming a plurality of reception beams, and
   said reception channel control means assigns said plurality of digital beam formation means respectively to the plurality of reception channels.

5. An apparatus according to claim 4, wherein said reception channel control means has a function of independently switching the elevation or inclination angle ranges of the simultaneously formed reception beams at different times.

6. An apparatus according to claim 1, further comprising a clutter component removal processing unit for removing a clutter component from the reception signal from said reception means, a moving target detection processing unit for detecting a moving target from the reception signal from said reception means, and a signal processing selection unit for selecting one, both, or neither of said clutter component removal processing unit and said moving target detection processing unit on the basis of the map stored in said map storage unit.

7. An apparatus according to claim 1, wherein said transmission means and said reception means share an antenna device.

8. An apparatus according to claim 7, wherein said antenna device uses an array antenna in which a plurality of antenna elements are arranged.

9. An apparatus according to claim 8, wherein said antenna device comprises beam formation pattern changing means for changing a beam formation pattern by selectively switching some or all of said plurality of antenna elements.

10. An apparatus according to claim 8, wherein said array antenna is a phased array antenna in which phase shifters for controlling phases of transmission and reception signals are attached to said plurality of antenna elements, and said antenna device comprises beam scanning means for scanning antenna beams in accordance with phase control of said phase shifters.

11. An apparatus according to claim 8, wherein said antenna device comprises an analog/digital converter for converting reception outputs from said plurality of antenna elements into digital signals, and an arithmetic processing unit for properly multiplying coefficients with the digital signals output from said antenna elements through said analog/digital converter, and an antenna pattern during transmission is changed in accordance with the coefficients.

12. An apparatus according to claim 11, wherein said reception channel control means comprises a coefficient generator for generating a coefficient to said arithmetic processing unit of said antenna device, and a coefficient control unit for outputting a coefficient corresponding to a reception range to said coefficient generator.

13. An apparatus according to claim 7, wherein said reception channel control means comprises map formation means for measuring reception intensities of each or all of a range, azimuth angle, and an elevation angle from the reception signal from said antenna device to form a map, and map storage means for storing the map formed by said map formation means, and said reception channel control means looks up the map stored in said map storage means to select a reception channel, and changing a pattern shape of a reception beam of the selected reception channel.

14. An apparatus according to claim 13, wherein said array antenna is a phased array antenna in which phase shifters for controlling phases of transmission and reception signals are attached to said plurality of antenna elements, said antenna device comprises beam scanning means for scanning antenna beams in accordance with phase control of said phase shifters, and said map formation means measures the reception intensities of each or all of the range, azimuth angle, and elevation angle for each scanning cycle from the reception signal from said antenna device, averages measurement results, and forms a map on the basis of each average value.

15. An apparatus according to claim 1, further comprising a clutter component removal processing unit for removing a clutter component from the reception signal from said reception means, a moving target detection processing unit for detecting a moving target from the reception signal from said reception means, and a signal processing selection unit for selecting one, both, or neither of said clutter component removal processing unit and said moving target detection processing unit in accordance with a reception range.

16. An apparatus according to claim 15, wherein said signal processing selection unit has a function of selectively determining said clutter component removal processing unit and said moving target detection processing unit in accordance with a remaining clutter component included in at least one of outputs from said clutter component removal processing unit and said moving target detection processing unit.

17. An apparatus according to claim 6, wherein said signal processing selection unit selectively determines said clutter component removal processing unit and said moving target detection processing unit in accordance with a remaining clutter component included in at least one of outputs from said clutter component removal processing unit and said moving target detection processing unit.

* * * * *